United States Patent
Lee

(10) Patent No.: US 9,996,730 B2
(45) Date of Patent: Jun. 12, 2018

(54) VISION-ASSIST SYSTEMS ADAPTED FOR INTER-DEVICE COMMUNICATION SESSION

(71) Applicant: Toyota Motor Engineering & Manufacturing North America, Inc., Erlanger, KY (US)

(72) Inventor: Christopher P. Lee, San Jose, CA (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 98 days.

(21) Appl. No.: 15/074,554

(22) Filed: Mar. 18, 2016

(65) Prior Publication Data

US 2017/0270347 A1    Sep. 21, 2017

(51) Int. Cl.
*G06K 9/00* (2006.01)
*H04W 12/06* (2009.01)
(Continued)

(52) U.S. Cl.
CPC ......... *G06K 9/00201* (2013.01); *G01C 21/00* (2013.01); *G06F 3/013* (2013.01);
(Continued)

(58) Field of Classification Search
None
See application file for complete search history.

(56) References Cited

U.S. PATENT DOCUMENTS

| 4,215,490 A | 8/1980 | Fewell |
| 5,047,952 A | 9/1991 | Kramer et al. |
| (Continued) | | |

FOREIGN PATENT DOCUMENTS

| CN | 201036605 | 3/2008 |
| CN | 201251445 | 6/2009 |
| (Continued) | | |

OTHER PUBLICATIONS http://www.humanware.com/en-usa/products/deafblind_communication_solutions/deafblind_communicator; Deaf Blind Communicator; 3 pages; accessed Jan. 4, 2016.
(Continued)

*Primary Examiner* — Shervin Nakhjavan
(74) *Attorney, Agent, or Firm* — Dinsmore & Shohl LLP

(57) ABSTRACT

Vision-assist systems including user eye tracking cameras are disclosed. A vision-assist system includes a processor, a memory module communicatively coupled to the processor, a user eye tracking camera communicatively coupled to the processor, an environment camera communicatively coupled to the processor, a feedback device communicatively coupled to the processor, and machine readable instructions stored in the memory module that, when executed by the processor, cause the vision-assist system to receive environment image data from the environment camera, determine a location of an individual speaking to a user based on the environment image data, receive user eye tracking image data from the user eye tracking camera, determine a pose of the user's eyes based on the user eye tracking image data, and provide feedback to the user with the feedback device based on the location of the individual speaking to the user and the pose of the user's eyes.

21 Claims, 6 Drawing Sheets

(51) Int. Cl.
*G06F 3/01* (2006.01)
*G06F 3/16* (2006.01)
*G06T 7/00* (2017.01)
*H04N 5/225* (2006.01)
*G01C 21/00* (2006.01)

(52) U.S. Cl.
CPC ........... *G06F 3/16* (2013.01); *G06K 9/00671* (2013.01); *G06T 7/004* (2013.01); *H04N 5/225* (2013.01); *H04W 12/06* (2013.01); *G06T 2207/10016* (2013.01); *G06T 2207/30232* (2013.01)

(56) References Cited

U.S. PATENT DOCUMENTS

| | | | |
|---|---|---|---|
| 7,446,669 B2 | 11/2008 | Liebermann | |
| 7,864,991 B2 | 1/2011 | Espenlaub et al. | |
| 8,606,316 B2 | 12/2013 | Evanitsky | |
| 9,111,545 B2 | 8/2015 | Jadhav et al. | |
| 9,488,833 B2* | 11/2016 | Cervantes | H04N 13/0239 |
| 9,625,990 B2* | 4/2017 | Moore | G06F 3/016 |
| 9,727,790 B1* | 8/2017 | Vaziri | G06K 9/00771 |
| 2005/0004801 A1* | 1/2005 | Liebermann | G10L 15/26 704/271 |
| 2006/0010199 A1* | 1/2006 | Brailean | H04L 29/06027 709/204 |
| 2007/0018890 A1 | 1/2007 | Kulyukin | |
| 2007/0192910 A1* | 8/2007 | Vu | B25J 5/007 700/245 |
| 2010/0199334 A1* | 8/2010 | Ehrensvard | G06F 21/34 726/5 |
| 2010/0263603 A1 | 10/2010 | Baron | |
| 2011/0307172 A1 | 12/2011 | Jadhav et al. | |
| 2012/0053826 A1* | 3/2012 | Slamka | G01C 21/165 701/301 |
| 2012/0200601 A1* | 8/2012 | Osterhout | G02B 27/0093 345/633 |
| 2014/0266571 A1 | 9/2014 | Sharma et al. | |
| 2014/0267642 A1* | 9/2014 | Wexler | G09B 21/006 348/62 |
| 2014/0337023 A1* | 11/2014 | McCulloch | G06F 1/163 704/235 |
| 2015/0002808 A1* | 1/2015 | Rizzo, III | A61F 9/08 351/158 |
| 2015/0379400 A1* | 12/2015 | Tatourian | H04L 67/22 706/46 |
| 2016/0026868 A1* | 1/2016 | Wexler | H04N 5/2257 382/103 |
| 2016/0063893 A1* | 3/2016 | Kanuganti | G09B 21/001 348/62 |
| 2016/0241767 A1* | 8/2016 | Cho | H04N 5/23203 |
| 2016/0259410 A1* | 9/2016 | Moore | G06F 3/016 |
| 2016/0272317 A1* | 9/2016 | Cho | G08G 1/09 |
| 2017/0109513 A1* | 4/2017 | Skogo | G06F 21/32 |
| 2017/0160813 A1* | 6/2017 | Divakaran | G06F 3/017 |

FOREIGN PATENT DOCUMENTS

| | | |
|---|---|---|
| CN | 103226018 | 7/2013 |
| CN | 103413456 | 11/2013 |
| CN | 203619858 | 6/2014 |
| KR | 2015088056 | 7/2015 |
| WO | 2008015375 | 2/2008 |

OTHER PUBLICATIONS

Kishor Vijay Patil; "A Review on Voice Based Passenger Bus Predicting Arrival of Bus for Easy Navigation of Blind"; URL: http://www.ijmetmr.com/olseptember2015/KishorVijayPatil-A-43; Publication: International Journal & Magazine of Engineering, Technology, Management and Research, Sep. 2015, pp. 1384-1390, vol. No. 2, Issue No. 9.

Outreach website; URL: http://www.outreach1.org/paratransit/para_mainpage.html.

Santa Clara Valley Transportation Authority website; URL: http://www.vta.org/flex.

U.S. Appl. No. 15/052,495, filed Feb. 24, 2016, not yet published.
U.S. Appl. No. 15/060,015, filed Mar. 3, 2016, not yet published.

\* cited by examiner

VISION-ASSIST SYSTEMS ADAPTED FOR INTER-DEVICE COMMUNICATION SESSION

TECHNICAL FIELD

The present specification generally relates to vision-assist systems and, more specifically, to vision-assist systems that are configured to recognize and communicate with other vision-assist systems.

BACKGROUND

Blind or visually impaired individuals may use handheld or body-mounted navigation-assist systems that can aid a user in navigating. GPS-based navigation units, for example, may be used to provide directions to a user but can be limited in accuracy in various instances. Remote assistance units may also provide video or image information to a remote individual who can provide assistance to a user, such as voice prompts to assist the user to navigate or avoid obstructions or other hazards. Further, a vision-assist unit may have an incomplete representation of an environment of interest. Environmental information available to the vision-assist system, for example, may be blocked by one or more obstructions or other factors.

Accordingly, a need exists for vision-assist systems that can communicate with one or more remote vision-assist systems and receive additional environmental information from the one or more remote vision-assist systems.

SUMMARY

In one embodiment, a vision-assist system capable of identifying and communicating with one or more remote vision-assist system is provided. The vision-assist system, for example, includes a processor, a memory module communicatively coupled to the processor, communication hardware configured to communicatively couple the processor to at least one remote vision-assist system, a camera communicatively coupled to the processor and a user feedback device communicatively coupled to the processor. Machine readable instructions are stored in the memory module and cause the vision-assist system to perform at least the following when executed by the processor: receive identification information of a remote vision-assist system, authenticate the identification information, initiate a communication session with the remote vision-assist system, receive environment information from the remote vision-assist system, and provide feedback to the user with the feedback device derived at least in part based on the environment information received from the remote vision-assist system.

In another embodiment, a method of obtaining environmental information via a vision-assist system and providing feedback to a user of the vision-assist system is provided. The method includes identifying at least one remote vision-assist device and establishing a communications session with the remote vision-assist device. The method further includes receiving environment information from the remote vision-assist device and analyzing the received environment information on the vision-assist system. The method also includes providing feedback to the user of the vision-assist system based at least in part on the received environment information.

In yet another embodiment, a vision-assist system is provided. The vision-assist system includes a necklace module comprising an environment camera mechanically coupled to the necklace module and a processor communicatively coupled to the environment camera. The vision-assist system further includes a memory module communicatively coupled to the processor and a feedback device communicatively coupled to the necklace module. Machine readable instructions are stored in the memory module and cause the vision-assist system to perform at least the following when executed by the processor: receive identification information of a remote vision-assist system, authenticate the identification information, initiate a communication session with the remote vision-assist system, receive environment information from the remote vision-assist system, and provide feedback to the user with the feedback device derived at least in part based on the environment information received from the remote vision-assist system.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include vision-assist systems configured to assist a blind or visually impaired user. The vision-assist system, for example, may monitor information related to an environment in which a user is located. The vision-assist system may further identify one or more person, animal, object, indicator or other information within the environment and provide information to assist the user in the environment. The vision-assist system is also adapted to identify and communicate with other remote vision-assist device. In one embodiment, for example, the vision-assist system is configured to receive identification information of a remote vision-assist system and authenticate the remote vision-assist device using the identification information. The vision-assist system may also initiate a communication session with the remote vision-assist system in order to obtain additional information related to the environment in which the user is located. Where the vision-assist system has an obstructed view or other sensory input, the vision-assist system may receive additional environment information from the remote vision-assist system. The vision-assist system may analyze that additional environment information (either alone or in combination with information detected by and/or stored on the receiving vision-assist system). Based on the environment information, the vision-assist system may provide feedback to the user derived at least in part based on the environment information received from the remote vision-assist device. The vision-assist system, for example, can receive environment information from one or more remote vision-assist systems and analyze that information, alone or in combination with information stored on the vision-assist system, to provide feedback to a user of the vision-assist system. Various vision-assist systems will be described in more detail herein with specific reference to the corresponding drawings.

Figure 1:
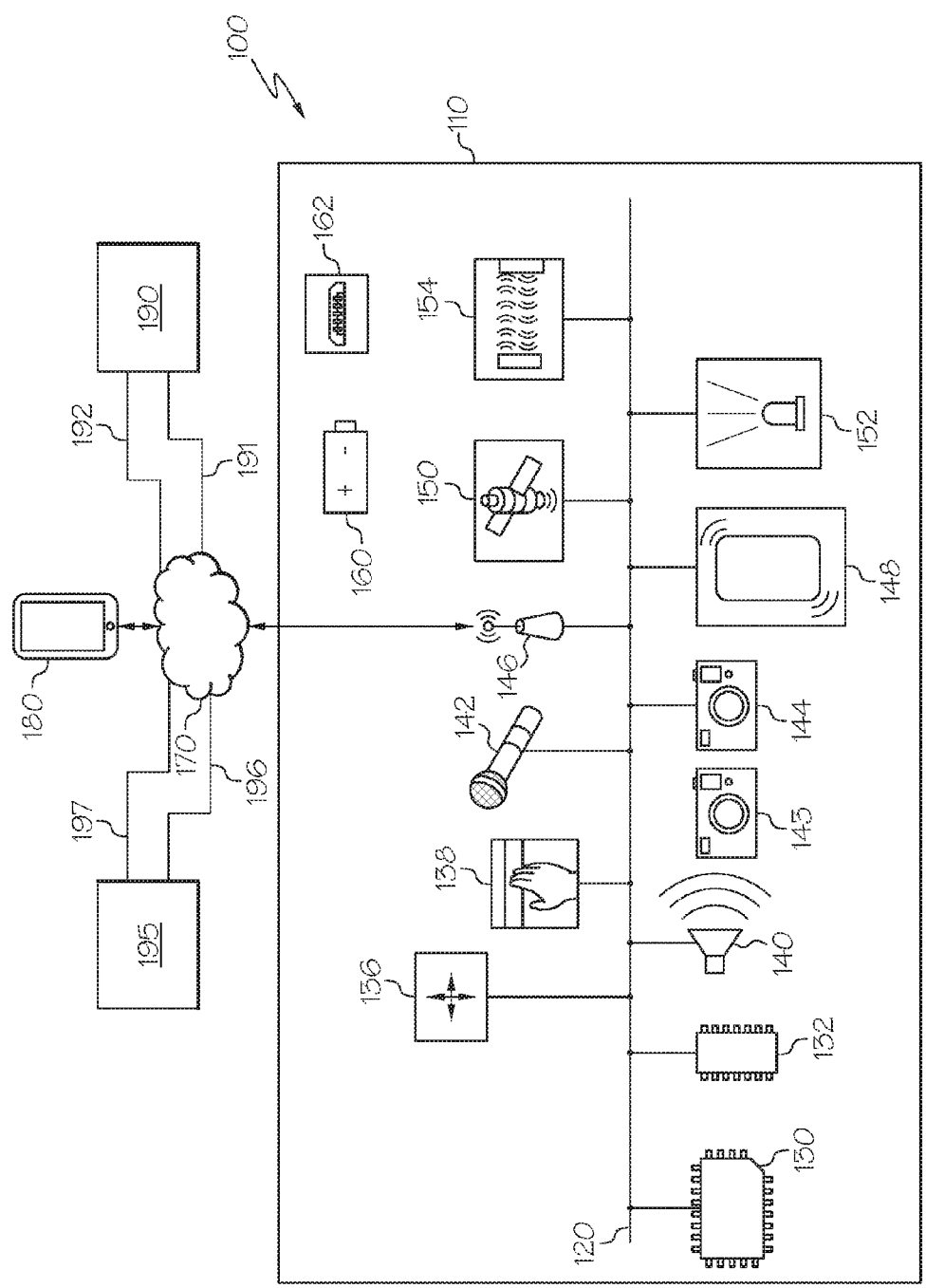
FIG. 1 schematically depicts a vision-assist system including a variety of sensors and electronic components, according to one or more embodiments shown and described herein.

Referring now to FIG. 1, one non-limiting example of a vision-assist system 100 is schematically depicted. The example vision-assist system 100 may be utilized by a blind or visually impaired person to help him or her navigate an environment. The vision-assist system 100 may take on many different configurations, such as eyeglasses (FIG. 2), a necklace (FIG. 3), or other configurations. The vision-assist system 100 illustrated in FIG. 1 includes a communication path 120, one or more processors 130, one or more memory modules 132, one or more inertial measurement units 136, tactile input hardware 138, one or more speakers 140, one or more microphones 142, one or more user eye tracking cameras 143, one or more environment cameras 144, communications hardware 146, one or more tactile feedback devices 148, one or more location sensors 150, one or more lights 152, one or more proximity sensors 154, one or more batteries 160, and one or more charging ports 162. It should be understood that more or fewer components may be utilized. The various components of the vision-assist system 100 and the interaction thereof will be described in detail below.

Still referring to FIG. 1, the communication path 120 may be formed from any medium that is capable of transmitting a signal such as, for example, conductive wires, conductive traces, optical waveguides, or the like. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the vision-assist system 100. As used herein, the term "communicatively coupled" means that coupled components are capable of exchanging data signals with one another such as, for example, electrical signals via conductive medium, electromagnetic signals via air, optical signals via optical waveguides, and the like.

Each of the one or more processors 130 of the vision-assist system 100 may be any device capable of executing machine readable instructions. Accordingly, each of the one or more processors 130 may be a controller, an integrated circuit, a microchip, a computer, or any other computing device. Each of the one or more processors 130 is communicatively coupled to the other components of the vision-assist system 100 by the communication path 120. Accordingly, the communication path 120 may communicatively couple any number of processors with one another, and allow the components coupled to the communication path 120 to operate in a distributed computing environment. Specifically, each of the components may operate as a node that may send and/or receive data.

Each of the one or more memory modules 132 of the vision-assist system 100 is coupled to the communication path 120 and communicatively coupled to the one or more processors 130. Each of the one or more memory modules 132 may comprise RAM, ROM, flash memories, hard drives, or any device capable of storing machine readable instructions such that the machine readable instructions can be accessed and executed by the one or more processors 130. The machine readable instructions may comprise logic or algorithm(s) written in any programming language of any generation (e.g., 1GL, 2GL, 3GL, 4GL, or 5GL) such as, for example, machine language that may be directly executed by the one or more processors 130, or assembly language, object-oriented programming (OOP), scripting languages, microcode, etc., that may be compiled or assembled into machine readable instructions and stored in the one or more memory modules 132. Alternatively, the machine readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Each of the one or more inertial measurement units 136 is coupled to the communication path 120 and communicatively coupled to the one or more processors 130. Each of the one or more inertial measurement units 136 may include one or more accelerometers and one or more gyroscopes. Each of the one or more inertial measurement units 136 transforms sensed physical movement of the vision-assist system 100 into a signal indicative of an orientation, a rotation, a velocity, or an acceleration of the vision-assist system 100. Some embodiments of the vision-assist system 100 may not include the one or more inertial measurement units 136, such as embodiments that include an accelerometer but not a gyroscope, embodiments that include a gyroscope but not an accelerometer, or embodiments that include neither an accelerometer nor a gyroscope. Some embodiments may not include the one or more inertial measurement units 136.

Still referring to FIG. 1, the tactile input hardware 138 is coupled to the communication path 120 and communicatively coupled to the one or more processors 130. The tactile input hardware 138, for example, allows the user to input information to the vision-assist system, such as give commands, request assistance, enter information, respond to a request or the like. The tactile input hardware 138 may be any device capable of transforming mechanical pressure (e.g, the pressure from a user contacting the tactile input hardware 138) into a data signal that can be transmitted over the communication path 120 such as, for example, a button, a switch, a knob, a microphone or the like. In some embodiments, the tactile input hardware 138 includes a power button, a volume button, an activation button, a scroll button, or the like. In some embodiments, the tactile input hardware 138 includes a pressure sensor, a touch strip, a pressure strip, or the like. Some embodiments may not include the tactile input hardware 138.

Each of the one or more speakers 140 is coupled to the communication path 120 and communicatively coupled to the one or more processors 130. The speakers 140 are adapted to provide information to a user, such as environmental information, feedback, instructions or the like. Each of the one or more speakers 140 transforms data signals from the vision-assist system 100 into audible mechanical vibrations. However, it should be understood that in other embodiments the vision-assist system 100 may not include the one or more speakers 140.

Each of the one or more microphones 142 is coupled to the communication path 120 and communicatively coupled to the one or more processors 130. The microphones 142 are adapted to receive audio input, such as environmental information, user commands, user requests or the like. Each of the one or more microphones 142 may be any device capable of transforming a mechanical vibration associated with sound into an electrical signal indicative of the sound. Some embodiments may not include the one or more microphones 142.

Each of the one or more user eye tracking cameras 143 is coupled to the communication path 120 and communicatively coupled to the one or more processors 130. The eye tracking cameras 143 are adapted to monitor eye movement of a user. Each of the one or more user eye tracking cameras 143 may be any device (e.g., a charge-coupled device (CCD)) having an array of sensing devices (e.g., pixels) capable of detecting radiation in an ultraviolet wavelength band, a visible light wavelength band, or an infrared wavelength band. Each of the one or more user eye tracking cameras 143 may have any resolution. The one or more user eye tracking cameras 143 may include an omni-directional camera, or a panoramic camera. In some embodiments, one or more optical components, such as a mirror, fish-eye lens, or any other type of lens may be optically coupled to at least one of the one or more user eye tracking cameras 143.

Each of the one or more environment cameras 144 is coupled to the communication path 120 and communicatively coupled to the one or more processors 130. The environment cameras 144 are adapted to collect image and/or video information from the environment of a user. The cameras 144, for example, may collect image and/or video information from the environment that may be used to identify obstructions, hazards, signals, signs or other information. Each of the one or more environment cameras 144 may be any device (e.g., a charge-coupled device (CCD)) having an array of sensing devices (e.g., pixels) capable of detecting radiation in an ultraviolet wavelength band, a visible light wavelength band, or an infrared wavelength band. Each of the one or more environment cameras 144 may have any resolution. The one or more environment cameras 144 may include an omni-directional camera, or a panoramic camera. In some embodiments, one or more optical components, such as a mirror, fish-eye lens, or any other type of lens may be optically coupled to at least one of the one or more environment cameras 144.

The communications hardware 146 (e.g., network interface hardware) is coupled to the communication path 120 and communicatively coupled to the one or more processors 130. The communications hardware 146 is adapted to transmit and/or receive data via a network 170 and/or directly with one or more other devices, such as, cell phones, smart phones, watches, tablets or other vision-assist devices. The communications hardware 146 may be any device capable of transmitting and/or receiving data via a network 170 and/or directly with one or more other devices, such but not limited to remote electronic device 180 and/or remote vision-assisted devices 190 and 195. Accordingly, the communications hardware 146 can include a communication transceiver for sending and/or receiving any wired or wireless communication. For example, the communications hardware 146 may include an antenna, a modem, LAN port, Wi-Fi card, WiMax card, mobile communications hardware, near-field communication hardware, satellite communication hardware and/or any wired or wireless hardware for communicating with other networks and/or devices. In some embodiments, the communications hardware 146 includes hardware configured to operate in accordance with the Bluetooth wireless communication protocol. In other embodiments, the communications hardware 146 includes hardware configured to operate in accordance with a wireless communication protocol other than Bluetooth.

Still referring to FIG. 1, in some embodiments, the vision-assist system 100 may be communicatively coupled to a remote electronic device 180 via the network 170 or a direct communication link. The remote electronic device 180, for example, may include other vision-assist systems, mobile phones, smart phones, watches, tablets, computers, and/or the like. The remote electronic devices 180 may be adapted to receive information (e.g., commands or requests) from a user and provide information to the user (e.g., directions, prompts, answers). In some embodiments, the network 170 is a personal area network that utilizes Bluetooth technology to communicatively couple the vision-assist system 100 and the remote electronic device 180. In other embodiments, the network 170 may include one or more computer networks (e.g., a personal area network, a local area network, or a wide area network), cellular networks, satellite networks and/or a global positioning system and combinations thereof. Accordingly, the vision-assist system 100 can be communicatively coupled to the network 170 and/or directly to one the remote electronic device 180 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

As stated above, the network 170 and/or a direct communication link may be utilized to communicatively couple the vision-assist system 100 with the remote electronic device 180. The remote electronic device 180 may include a mobile phone, a smartphone, a personal digital assistant, a camera, a dedicated mobile media player, a mobile personal computer, a laptop computer, and/or any other remote electronic device capable of being communicatively coupled with the vision-assist system 100. The remote electronic device 180 may include one or more processors and one or more memories. The one or more processors can execute logic to communicate with the vision-assist system 100. The remote electronic device 180 may be configured with wired and/or wireless communication functionality for communicating with the vision-assist system 100. In some embodiments, the remote electronic device 180 may perform one or more elements of the functionality described herein, such as in embodiments in which the functionality described herein is distributed between the vision-assist system 100 and the remote electronic device 180. In some embodiments, the remote electronic device 180 may provide a user interface through which one or more settings or configurations of the vision-assist system 100 may be altered (e.g., the ability to turn feedback on or off, adjusting the frequency of feedback, adjusting the type of feedback, etc.). In some embodiments, the vision-assist system 100 is not communicatively coupled to a remote electronic device 180.

Still referring to FIG. 1, each of the one or more tactile feedback devices 148 is coupled to the communication path 120 and communicatively coupled to the one or more processors 130. The tactile feedback devices 148 may, for example, provide information to a user of a vision-assist system, such as directions, requests, responses, navigation assistance, warnings or other information. Each of the one or more tactile feedback devices 148 may be any device capable of providing tactile feedback to a user. The one or more tactile feedback devices 148 may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). Some embodiments may not include the one or more tactile feedback devices 148.

Each of the one or more location sensors 150 is coupled to the communication path 120 and communicatively coupled to the one or more processors 130. The location sensors 150 may determine a location (e.g., absolute and/or relative) of the vision-assist system and/or user. Each of the one or more location sensors 150 may be any device capable of generating an output indicative of a location. In some embodiments, the one or more location sensors 150 include a global positioning system (GPS) sensor, though embodiments are not limited thereto. Some embodiments may not include the one or more location sensors 150, such as embodiments in which the vision-assist system 100 does not determine a location of the vision-assist system 100 or embodiments in which the location is determined in other ways (e.g., based on information received from the one or more environment cameras 144, the one or more microphones 142, the communications hardware 146, the one or more proximity sensors 154, the one or more inertial measurement units 136 or the like).

Each of the one or more lights 152 is coupled to the communication path 120 and communicatively coupled to the one or more processors 130. The lights 152, for example, may provide information to a user of a vision-assist system, such as system status information, navigation or other direction information, commands or the like, and/or may assist a user by providing a source of illumination for the user. Each of the one or more lights 152 may be any device capable of outputting light, such as but not limited to a light emitting diode, an incandescent light, a fluorescent light, or the like. In some embodiments, the one or more lights 152 include a power indicator light that is illuminated when the vision-assist system 100 is powered on. In some embodiments, the one or more lights 152 include an activity indicator light that is illuminated when the vision-assist system 100 is active or processing data. In some embodiments, the one or more lights 152 includes an illumination light for illuminating a field proximate the vision-assist system 100 (e.g. for illuminating an area in the field of view of a user of the vision-assist system 100). Some embodiments may not include the one or more lights 152.

Each of the one or more proximity sensors 154 is coupled to the communication path 120 and communicatively coupled to the one or more processors 130. The proximity sensors 154, for example, may determine a proximity of the vision-assist system and/or user to one or more other people or objects, such as other users, obstructions, hazards, safe paths (e.g., cross-walks) or the like. Each of the one or more proximity sensors 154 may be any device capable of determining proximity and/or outputting a proximity signal indicative of a proximity of the vision-assist system 100 and/or the user to an individual or object. In some embodiments, the one or more proximity sensors 154 may include a laser scanner, a capacitive displacement sensor, a Doppler effect sensor, an eddy-current sensor, an ultrasonic sensor, a magnetic sensor, an optical sensor, a radar sensor, a sonar sensor, or the like. Some embodiments may not include the one or more proximity sensors 154, such as embodiments in which the proximity of the vision-assist system 100 to an individual speaking with a user of the vision-assist system 100 is determine from inputs provided by other sensors (e.g., the one or more environment cameras 144, the one or more speakers 140, etc.) or embodiments that do not determine a proximity of the vision-assist system 100 and/or the user to an individual and/or object.

The vision-assist system 100 is powered by the one or more batteries 160 or other energy storage device, each of which is electrically coupled to the various electrical components of the vision-assist system 100. Each of the one or more batteries 160 may be any device capable of storing electric energy for later use by the vision-assist system 100. In some embodiments, the one or more batteries 160 may include a rechargeable battery, such as a lithium-ion battery or a nickel-cadmium battery. In embodiments in which the one or more batteries 160 include a rechargeable battery, the vision-assist system 100 may include the one or more charging ports 162, each of which may be used to charge the one or more batteries 160. Some embodiments may not include the one or more batteries 160, such as embodiments in which the vision-assist system 100 is powered by solar energy or energy harvested from the environment. Some embodiments may not include the one or more charging ports 162, such as embodiments in which the vision-assist system 100 utilizes disposable batteries for power.

It should be understood that the components of the vision-assist system 100 (including, but not limited to the one or more processors 130, the one or more memory modules 132, the one or more inertial measurement units 136, the tactile input hardware 138, the one or more speakers 140, the one or more microphones 142, the one or more user eye tracking cameras 143, the one or more environment cameras 144, the communications hardware 146, the one or more tactile feedback devices 148, the one or more location sensors 150, the one or more lights 152, the one or more proximity sensors 154, the one or more batteries 160, and the one or more charging ports 162) may be distributed among a variety of physical modules, each of which are communicatively coupled via a wireless network or a wired network. For example, in some embodiments described below, the components of the vision-assist system 100 may be distributed among an eyeglass module, a necklace, and/or an earpiece, each of which may be wirelessly communicatively coupled or communicatively coupled via one or more wires. Furthermore, while the vision-assist system 100 depicted in FIG. 1 includes the one or more tactile feedback devices 148 and the one or more speakers 140 as possible feedback devices communicatively coupled to the one or more processors 130, embodiments are not limited thereto. In other embodiments, a feedback device other than the one or more tactile feedback devices 148 or the one or more speakers 140 may provide feedback to a user of the vision-assist system 100, such as in embodiments that provide feedback with a display module, or any other device capable of providing feedback to the user.

In some embodiments, the vision-assist system 100 may communicatively couple to one or more remote vision-assist systems 190, 195 via the network 170 via network communications links 192, 197 and/or a direct communication link 191, 196 as shown in FIG. 1. As described in more detail below, the vision-assist system 100 may communicate with one or more remotes vision-assist systems 190, 195 for the purpose of obtaining information about an environment of interest to a user of the vision-assist system 100. A remote vision-assist system 190, 195, for example, may be worn or otherwise utilized by other users, such as blind or visually impaired users or users for the purpose of assisting one or more blind or visually impaired individuals. A remote vision-assist system 190,195, for example, is another device adapted to communicate with vision-assist system 100 and is further adapted to determine information about an environment of interest to a vision-assist system 100 and provide that information to the vision-assist system 100. The remote vision-assist systems 190,195 may, for example, be adapted to collect information about the environment of interest to the user of the vision-assist system 100, such as via one or more cameras, microphones, location sensors, proximity sensor or other input devices. The remote vision-assist systems 190, 195 may also be adapted to provide that information and/or information derived from that information to the vision-assist system 100. Where the vision-assist system 100 is unable to determine information about the environment of interest, whether due to one or more obstructions or lack of capability of the vision-assist system 100 itself (e.g., lack of a camera, microphone, location sensor, proximity sensory or other input device), the vision-assist system 100 may request information from the one or more remote vision-assist systems.

In some embodiments, the network 170 is a personal area network that utilizes Bluetooth technology to communicatively couple the vision-assist system 100 and the remote electronic device 180. In other embodiments, the network 170 may include one or more computer networks (e.g., a personal area network, a local area network, or a wide area network), cellular networks, satellite networks and/or a global positioning system and combinations thereof. Accordingly, the vision-assist system 100 can be communicatively coupled to the network 170 and/or directly to one the remote vision-assist systems 190, 195 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

As stated above, the network 170 and/or a direct communication link (e.g., links 191, 196) may be utilized to communicatively couple the vision-assist system 100 with the one or more remote vision-assist devices 190, 195. The remote vision-assist systems 190, 195 may include a vision-assist system similar to the vision-assist system 100 or other vision-assist system capable of being communicatively coupled with the vision-assist system 100. The remote vision-assist systems 190, 195 may include one or more processors and one or more memories. The one or more processors are adapted to execute logic to communicate with the vision-assist system 100 such as described herein with respect to the vision-assist system 100. The one or more remote vision-assist system 190, 195 may be configured with wired and/or wireless communication functionality for communicating with the vision-assist system 100. In some embodiments, the remote vision-assist system 190, 195 may perform one or more elements of the functionality described herein, and the vision-assist system 100 and one or more of the remote vision-assist systems 190, 195 may share information related to one or more of the functionalities being performed by the various devices. In one non-limiting example, the remote vision-assist system, 190, 195 is worn by another user. In another non-limiting example, the remote vision-assist system 190, 195 is not worn by a user, but is rather a fixture within the environment (e.g., mounted on a wall or ceiling). In yet a further non-limiting example, the remote vision-assist system 190, 195 may be mobile, such as a robot operable to move about the environment. In one embodiment, a vision-assist system that may not include one or more functionalities performed by other system(s) or that is unable to determine certain information (e.g., where one or more input devices such as a camera, microphone communications device may not be able to detect one or more inputs).

In some embodiments, the vision-assist system 100 and/or the remote vision-assist systems 190, 195 may provide identification information, such as an identification code or the like, that identifies the device as a vision-assist system capable of communicating with one or more other vision-assist devices to provide and/or share information with the one or more other vision-assist devices. In one embodiment, the vision-assist system 100 and/or the remote vision-assist systems may broadcast or otherwise provide the identification information for receipt by one or more other vision-assist systems that are within a communication range or otherwise communicatively capable of communicating with the broadcasting vision-assist system (e.g., via the network 170). In some embodiments, the identification information may include one or more of a unique device identifier, a unique user identifier, a device-type identifier, a user-type identifier, device capability identification or the like.

Upon receipt, a receiving vision-assist system may compare the identification information to one or more tables, databases or other data stores (e.g., stored in memory 132) to confirm the authenticity of the transmitting device. In the event that the receiving vision-assist system confirms the authenticity of the transmitting device, the receiving vision-assist system may initiate a communication session using any standard or proprietary communication protocols (e.g., Bluetooth, WiFi, NFC or other communication protocol). In one embodiment, the receiving vision-assist system provides identification information of the receiving vision-assist system to the transmitting vision-assist system that may be used by that system to authenticate the other vision-assist system.

Upon authentication by each communicating vision-assist system, one or more of the vision-assist systems may establish a communication session in which one or more of the participating systems provide information determined by the respective system. In various embodiments, for example, the one or more participating vision-assist systems may provide image, video, sound, inertial measurement, location, user input/output information, proximity information and/or other sensor information that has been detected or determined based upon detected information to the one or more other participating vision-assist systems.

A receiving vision-assist system may analyze the information received from a transmitting vision-assist system, either alone or in combination with other information stored (e.g., in memory 132) on the receiving vision-assist system. Received image or video information, for example, may be combined and analyzed with other image or video information stored on the receiving vision-assist system to provide a more complete image of an environment of interest to a user of one or more of the participating vision-assist systems. Where the image or video information of one or more of the participating vision-assist systems is incomplete (e.g., blocked by an obstruction), the receiving vision-assist system may generate a more complete image or video representation of the environment of interest than a single vision-assist system alone. In one particular embodiment, the vision-assist system may then provide this completed image or video analysis or information derived from that image or video analysis to one or more other participating vision-assist systems. In this manner, distributed processing may be used on different vision-assist systems to analyze environmental information and provide resulting information to one or more other participating vision-assist systems.

In one embodiment, a vision-assist system can automatically recognize other vision-assist systems in the area or capable of communicating with the other vision-assist systems. The vision-assist system 100 may automatically authenticate the other available vision-assist system(s) and/or may prompt a user (e.g., via an output device of the system 100 or the remote electronic device 180). The vision-assist system 100, for example, may authenticate and identify the one or more available remote vision-assist systems available for connection (e.g., by device, user, capability and/or other information). The user of the system 100, in this embodiment, would be able to select one or more available remote vision-assist systems for connection and initiate a communication session request to be transmitted to the selected remote vision-assist system(s). A user of a selected remote vision-assist system(s) can similarly be given the opportunity to authorize connection of the two or more vision-assist systems. In other embodiments, the vision-assist system 100 may automatically authenticate and establish a communication session with one or more of the other available vision-assist systems.

In one embodiment, a communication session established between two or more vision-assist systems may further provide a communications session between users of the participating systems in addition to sharing information between the devices. In this embodiment, for example, the users may participate in an audio, video, text, Braille, or other medium communication session with each other. Thus, in addition to the participating vision-assist systems sharing information, the users of the vision-assist systems may also communicate with one another.

Figure 2:
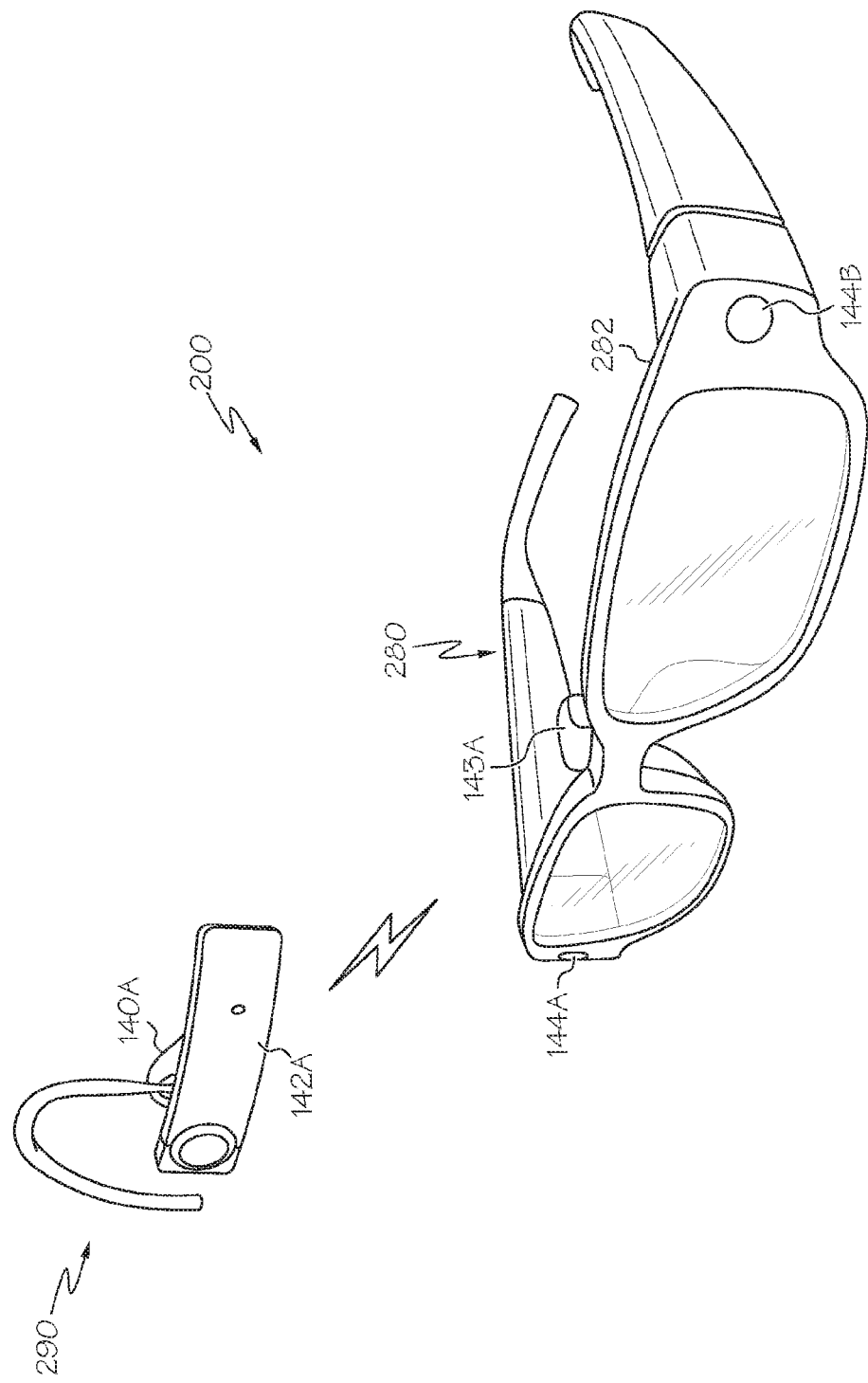
FIG. 2 schematically depicts a perspective view of an example vision-assist system including an eyeglass module and an earpiece module, according to one or more embodiments shown and described herein.

Referring now to FIG. 2, a perspective view of a non-limiting example embodiment of a vision-assist system 200 is schematically depicted. It should be understood that embodiments are not limited to the eyeglass module and earpiece module configuration. In this embodiment, the vision-assist system 200 includes an eyeglass module 280 and an earpiece module 290. In this illustrated embodiment, the eyeglass module 280 includes an eyeglass frame 282, a user eye tracking camera 143A, a first environment camera 144A, and a second environment camera 144B. The user eye tracking camera 143A is included in the one or more user eye tracking cameras 143 described above with reference to FIG. 1. The first environment camera 144A and the second environment camera 144B are included in the one or more environment cameras 144 described above with reference to FIG. 1.

Still referring to the eyeglass module 280 depicted in FIG. 2, the eyeglass frame 282 is operable to be worn by a user in the manner of a conventional eyeglass frame. The user eye tracking camera 143A is mechanically coupled to a central interior portion of the eyeglass frame 282. The first environment camera 144A is mechanically coupled to a first exterior end of the eyeglass frame 282. The second environment camera 144B is mechanically coupled to a second exterior end of the eyeglass frame 282. While the eyeglass module 280 depicted in FIG. 2 includes one user eye tracking camera 143A, other embodiments may include none or more than one user eye tracking camera. Likewise, while the eyeglass module 280 depicted in FIG. 2 includes the first environment camera 144A and the second environment camera 144B, other embodiments may include only a single environment camera or more than two environment cameras. Some embodiments may not include an environment camera, such as embodiments in which the environment camera is coupled to a remote computing device that is wirelessly communicatively coupled to the eyeglass module 280. In some embodiments, at least one of the one or more processors 130 and at least one of the one or more memory modules 132 (described above with reference to FIG. 1) are mechanically coupled to the eyeglass frame 282.

Still referring to FIG. 2, the earpiece module 290 is wirelessly communicatively coupled to the eyeglass module 280 (though in other embodiments the earpiece module 290 may be communicatively coupled to the eyeglass module 280 by one or more wires). In embodiments in which the earpiece module 290 is wirelessly communicatively coupled to the eyeglass module 280, both the earpiece module 290 and the eyeglass module 280 include network interface hardware operable to wirelessly communicate information between the eyeglass module 280 and the earpiece module 290. In other embodiments, the earpiece module 290 is integrated with the eyeglass module 280.

Still referring to the earpiece module 290 depicted in FIG. 2, the earpiece module 290 includes a microphone 142A and a speaker 140A, each of which are wirelessly communicatively coupled to the eyeglass module 280. The earpiece module 290 is configured to be worn around the ear of a user. The speaker 140A is included in the one or more speakers 140 described above with reference to FIG. 1. The speaker 140A is configured to be inserted into the user's ear and produces the audible messages described herein. The microphone 142A is included in the one or more microphones 142 described above with reference to FIG. 1. The microphone 142A may serve as a user input device for inputting information (e.g., voice controls) into the vision-assist system 200. In some embodiments, the microphone 142A may receive a mechanical vibration associated with sound from an individual speaking with the user into an electrical signal, which may be used by the vision-assist system 200 to determine the location of the individual, as will be described further below.

Figure 3:
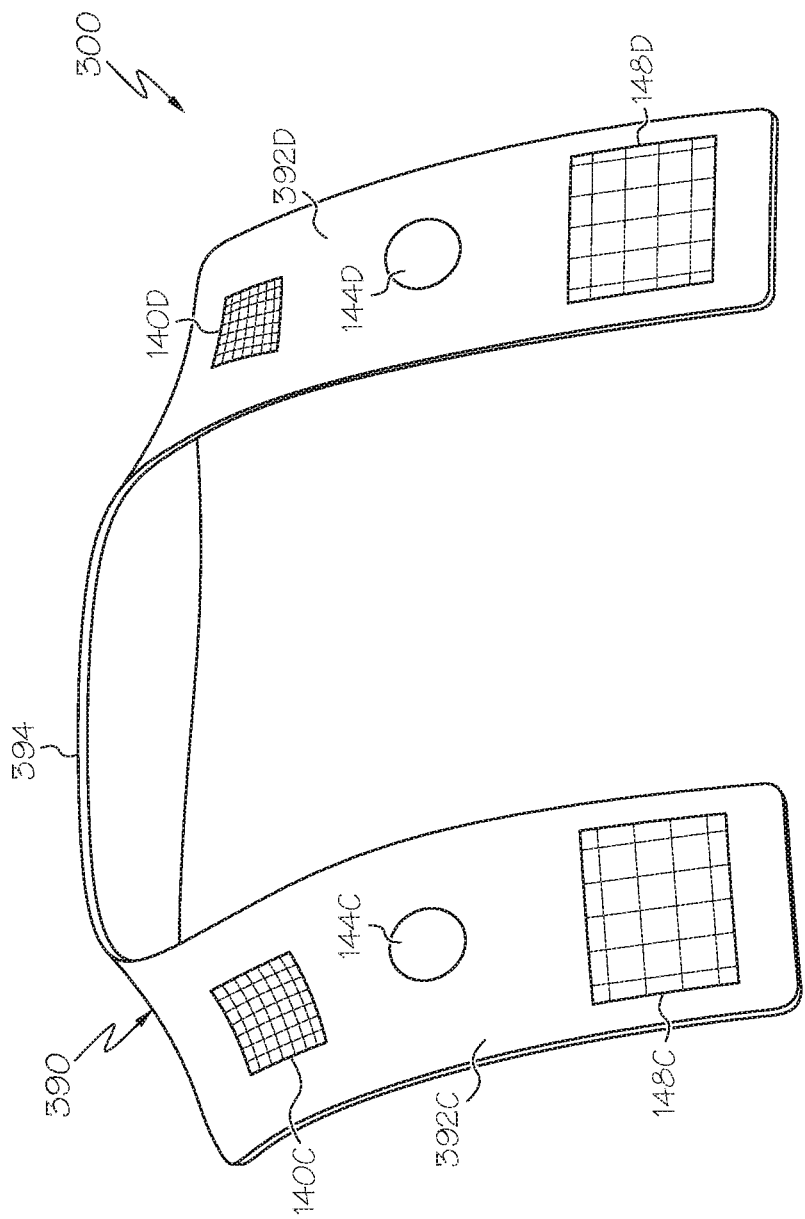
FIG. 3 schematically depicts a perspective view of another example vision-assist system including a necklace module, according to one or more embodiments shown and described herein.

Referring now to FIG. 3, a perspective view of another non-limiting example vision-assist system 300 is schematically depicted. In the illustrated example of FIG. 3, the vision-assist system 300 includes a necklace module 390. The necklace module 390 may be used independently or may be used in combination with one or more other modules, such as the eyeglass module and/or earpiece module shown in FIG. 2.

Still referring to the necklace module 390 depicted in FIG. 3, the necklace module 390 has a necklace configuration intended to be worn around the neck of the user. The necklace module 390 includes a neck portion 394, a first chest portion 392C and a second chest portion 392D. It should be understood that the necklace module 390 may be configured differently than what is illustrated in FIG. 3, and that the necklace module 390 may take on different shapes and sizes in other embodiments.

Still referring to the necklace module 390 depicted in FIG. 3, the necklace module 390 includes a first environment camera 144C, a second environment camera 144D, a first speaker 140C, a second speaker 140D, a first tactile feedback device 148C, and a second tactile feedback device 148D, each of which are wirelessly communicatively coupled to the eyeglass module 380. The first environment camera 144C is mechanically coupled to the first chest portion 392C. The second environment camera 144D is mechanically coupled to the second chest portion 392D. The first environment camera 144C and the second environment camera 144D are included in the one or more environment cameras 144 described above with reference to FIG. 1. While the necklace module 390 depicted in FIG. 3 includes the first environment camera 144C and the second environment camera 144D, other embodiments may include only a single environment camera or multiple environment cameras.

Still referring to FIG. 3, the first speaker 140C is mechanically coupled to the first chest portion 392C. The second speaker 140D is mechanically coupled to the second chest portion 392D. The first speaker 140C and the second speaker 140D are included in the one or more speakers 140 described above with reference to FIG. 1. While the necklace module 390 depicted in FIG. 3 includes the first speaker 140C and the second speaker 140D, other embodiments may include only a single speaker.

Still referring to FIG. 3, the first tactile feedback device 148C is mechanically coupled to the first chest portion 392C. The second tactile feedback device 148D is mechanically coupled to the second chest portion 392D. The first tactile feedback device 148C and the second tactile feedback device 148D are included in the one or more tactile feedback devices 148 described above with reference to FIG. 1. While the necklace module 390 depicted in FIG. 3 includes the first tactile feedback device 148C and the second tactile feedback device 148D, other embodiments may include only a single tactile feedback device.

Some embodiments of the necklace module 390 may not include a speaker, may not include an environment camera and/or may not include a tactile feedback device. For example, some embodiments that only provide feedback with a speaker may not include a tactile feedback device. Conversely, some embodiments that only provide feedback with a tactile feedback device may not include a speaker.

Figure 4:
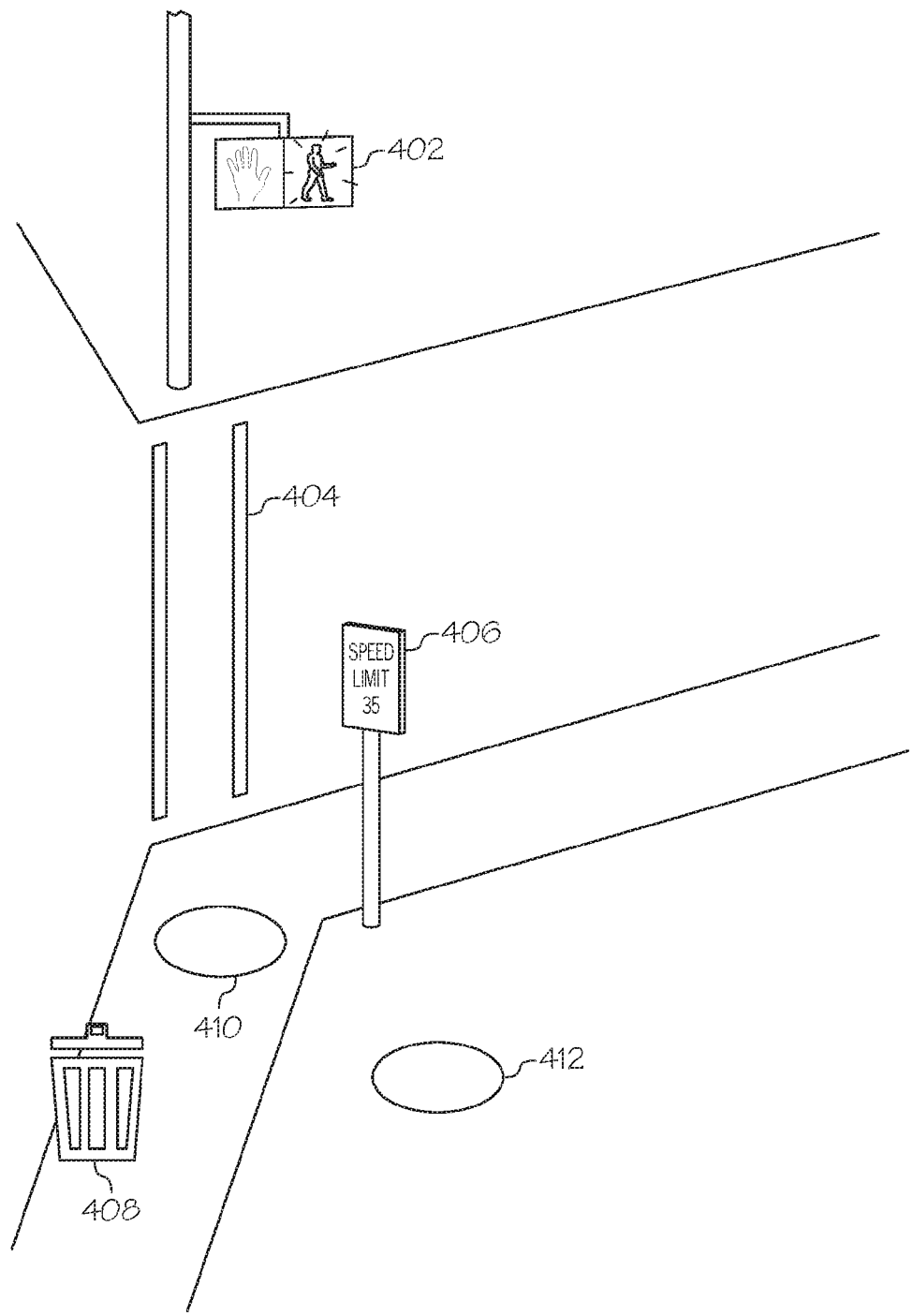
FIG. 4 schematically depicts a perspective view of a user utilizing the vision-assist system to obtain information about the user's surrounding environment, according to one or more embodiments shown and described herein.

Having described the hardware and components of various vision-assist systems, an example of a use of an example vision-assist system will now be provided with reference to FIG. 4.

FIG. 4 schematically depicts a perspective view of a non-limiting example environment in which a user may utilize a vision-assist system to establish a communication with a remote vision-assist device and obtain information related to the environment that may not be available to the user solely using the vision-assist system, such as due to obstructions or limitations of the particular vision-assist device of the user. In this example, a cross-walk indicator 402 is provided at a cross-walk 404. An obstruction, such as sign 406, may at least partially obstruct the view of the cross-walk indicator 402 from one or more locations in the environment. A hazard, in this case a trash receptacle 408, may also be located in the environment and may not be readily observed by a user and/or a vision-assist system depending upon the location of the vision-assist system within the environment. In the illustration of FIG. 4, for example, a user and/or vision-assist system may have an at least partially obstructed view of the cross-walk indicator 402 at location 412, but a full (or at least satisfactory) view of the cross-walk indicator 402 at location 410.

In one non-limiting example, a vision-assist system of a user at location 412 has an at least partially obstructed view of the cross-walk indicator 402 and/or the cross-walk 404 and, thus, may be unable to determine exactly where the cross-walk is located and whether it is safe to cross within the cross-walk once it is located.

The vision-assist system may, for example, may include a processor or other circuitry for performing various object recognition algorithms, such as a scale-invariant feature transform (SIFT) algorithm or object recognition processes. A SIFT algorithm, for example, uses computer vision technology to detect and describe local features in images. Points on an object may be extracted to provide a feature description of the object. This description, extracted from a training image, may then be used to identify an object (e.g., a cross-walk, cross-walk indicator, hazard and/obstruction) when attempting to locate the object in a test image containing many other objects. Features extracted from a training image in various implementations may be detectable even under changes in image scale, noise and illumination.

The vision-assist system may further monitor for predetermined objects, states, indicators, paths, movements and/or changes in the environment based upon one or more input signals received by the vision-assist system. The detected information, in various implementations, may include a walk or do not walk indication of a cross-walk indicator, potential hazards or obstructions, safe routes, moving people or objects likely to interact with a user of the vision-assist system. Where a user desires to cross the street in the cross-walk 404, for example, the vision-assist system can be adapted to use one or more sensors, such as one or more cameras, to locate a cross-walk marked in the street or other safe location to cross the street. The vision-assist system may also be adapted to locate and monitor the cross-walk indicator 402 for an indication (e.g., "WALK" light) that it is safe to enter the cross-walk. The vision-assist system may detect information, for example, by image recognition software or other data analysis software.

Objects, hazards, obstructions, indicators, people, animals, activities and other information related to the environment may be individually identified, and/or identified by an object class. An object, person, animal, hazard, obstruction and/or indicator, such as the cross-walk indicator 402, may be monitored over time, continuously, or at intervals. The environment information may include a location, configuration (if appropriate), operational condition or other state parameter that may be appropriate. In some examples, human, animal or inanimate device (e.g., vehicle) actions may also be detected and categorized.

A pattern recognition algorithm may be used to compare environmental information observed to sets of previously observed data. Any pattern recognition algorithm may be used, such as a nearest neighbor algorithm, or algorithms well known in other fields such as genetics. In some examples, current environmental information may be compared with previously observed environmental information. However, as the volume of stored data increases, frequent patterns may be identified. Frequent patterns may also be codified as a rule. In this particular example, a cross-walk indicator may be first compared with known frequent patterns and, if appropriate, rules. If no match occurs a more extensive comparison may be made. In other examples, a looser match to previously observed environmental information may be used if no initial match is made.

A processor, controller and/or circuitry of the vision-assist system receive one or more sensor inputs corresponding to the environment in which the user is located. In various implementations contemplated herein, the sensors may include one or more of a number of different types of sensors that are adapted to sense information related to the surroundings and interactions of the user. For example, sensors such as a still camera, a video camera, an inertial movement unit (IMU), a microphone, an acceleration sensor, an orientation sensor or the like may be used in various implementations.

As discussed above, one or more sensors (e.g., one or more cameras and/or microphones) may provide information about the environment from which a recommended action or change in action can be selected. In one implementation, for example, a camera may provide one or more images related to the cross-walk indicator, traffic observed within or near the cross-walk 404, weather conditions, lighting or other information related to an intersection within the environment. A microphone or other sound sensor may further provide sound information, such as an audible indication of the cross-walk indicator 402, traffic sounds, sirens indicating the possibility of emergency vehicles in the area, to help identify if entering the cross-walk 404 is safe for the user. A necklace or other form factor wearable vision-assist device may, for example, include one or more camera and/or microphone sensors directed away from the user to collect information from the environment surrounding the user.

An operation of determining activities occurring in the surrounding environment near the user may, for example, include using images to detect environmental information for the user. As described above, various object recognition algorithms, such as a scale-invariant feature transform (SIFT) algorithm, or object recognition processes may be used. The device may further monitor the surrounding area for changes in activities or context that may be related to an activity of the user based upon one or more input signals received related to the environment. The changes in various implementations may include movements of the user and/or one or more other people, animals or objects detected by one or more sensors of the device. Environmental information and/or changes in environmental information may be detected, for example, by image recognition software or other data analysis software.

Sensors of the vision-assist system, such as a camera, a microphone, an IMU, an acceleration sensor, an orientation sensor may further be used to detect information related to the user and the user's activities occurring within the environment. An IMU, for example, may be used to detect the user's velocity, orientation and/or acceleration using one or more of accelerometers, gyroscopes and magnetometers. The information provided by the IMU may be used, alone or in combination with one or more other sensors may be used to provide information related to the user, such as location, direction, activity, speed, acceleration. The IMU information, for example, may indicate that the user is walking or running, or may provide information related to the direction or orientation of the user. A microphone, for example, may be used to determine whether the user is talking, yelling or making noise, moving quickly. A microphone may also be used to determine one or more sounds related to another person or a surrounding area in the environment that may be useful in determining one or more activity, location, hazard, safe route, etc. Acceleration and/or orientation sensors similarly may be used individually or as part of an IMU as described above. Such information from various sensors may be used to determine, alone or in combination with other sensor information, information related to the user and/or the environment.

Information gathered and analyzed from and/or related to the environment may be used to provide information to a user, such as directions, commands, warnings or other information that may be helpful to the user.

In some situations, however, information collected by the vision-assist system may be incomplete. The user and/or vision-assist system, for example, may want more information before taking or recommending a given course of action by the user. In the illustrated example of FIG. 4, for example, a user and a vision-assist system located in region 412 of the environment may have an obstructed view of the cross-walk indicator 402 and not be able to see whether the indicator is displaying a "WALK" or DON'T WALK" indication and/or may be unable to determine a safe route to the cross-walk 404. In this instance, the user and/or the vision-assist system may establish a communications session with one or more remote vision-assist devices that may be able to observe relevant information within the environment. As stated above, the remote vision-assist system may be worn by another blind or visually impaired user, a non-impaired user to assist one or more blind or visually impaired individuals, or may be a fixed system within the environment that is capable of communicating with the vision-assist device.

In one example non-limiting embodiment, the vision-assist system (independently or upon a request from the user) may monitor the environment for the presence of a remote vision-assist device and/or may broadcast a request for assistance from one or more remote vision-assist devices.

In some embodiments, for example, the vision-assist system and/or one or more remote vision-assist systems may provide identification information, such as an identification code or the like, that identifies the device as a vision-assist system capable of communicating with one or more other vision-assist devices to provide and/or share information with the one or more other vision-assist devices. In one embodiment, the vision-assist system and/or the remote vision-assist systems may broadcast or otherwise provide the identification information for receipt by one or more other vision-assist systems that are within a communication range or otherwise communicatively capable of communicating with the broadcasting vision-assist system (e.g., directly or via a network). In some embodiments, the identification information may include one or more of a unique device identifier, a unique user identifier, a device-type identifier, a user-type identifier, device capability identification or the like.

Upon receipt, a receiving vision-assist system may compare the identification information to one or more tables, databases or other data stores (e.g., stored in memory) to confirm the authenticity of the transmitting device. In the event that the receiving vision-assist system confirms the authenticity of the transmitting device, the receiving vision-assist system may initiate a communication session using any standard or proprietary communication protocols (e.g., Bluetooth, WiFi, NFC or other communication protocol). In one embodiment, the receiving vision-assist system provides identification information of the receiving vision-assist system to the transmitting vision-assist system that may be used by that system to authenticate the other vision-assist system.

Upon authentication by each communicating vision-assist system, one or more of the vision-assist systems may establish a communication session in which one or more of the participating systems provide information determined by the respective system. In various embodiments, for example, the one or more participating vision-assist systems may provide image, video, sound, inertial measurement, location, user input/output information, proximity information and/or other sensor information that has been detected or determined based upon detected information to the one or more other participating vision-assist systems.

A receiving vision-assist system may analyze the information received from a transmitting vision-assist system, either alone or in combination with other information stored (e.g., in memory) on the receiving vision-assist system. In the example illustrated in FIG. 4, for example, where the receiving vision-assist system has an incomplete view of an item of interest in the environment, such as the cross-walk indicator 402, the cross-walk 404 and/or the hazard 408, the receiving vision-assist system may request and/or receive environmental information from a remote vision-assist system (e.g., a remote vision-assist device located within region 410 of the environment having a clear or at least satisfactory view of the cross-walk indicator 402, the cross-walk and/or the hazard 408). Received image, video or audio information, for example, may be combined and analyzed with other image or video information stored on the receiving vision-assist system to provide a more complete image of an environment of interest to a user of one or more of the participating vision-assist systems.

Thus, where the environmental information (e.g., image, video or audio information) of one or more of the participating vision-assist systems is incomplete (e.g., blocked by an obstruction), the receiving vision-assist system may receive additional environmental information and generate a more complete image, video and/or audio representation of the environment of interest than a single vision-assist system alone. In one particular embodiment, the vision-assist system may then provide this completed image or video analysis or information derived from that image or video analysis to one or more other participating vision-assist systems. In this manner, distributed processing may be used on different vision-assist systems to analyze environmental information and provide resulting information to one or more other participating vision-assist systems.

In one embodiment, a vision-assist system can also automatically recognize other vision-assist systems in the area capable of communicating with the other vision-assist systems. The vision-assist system may automatically authenticate the other available vision-assist system(s) and/or may prompt a user (e.g., via an output device of the system or a remote electronic device coupled to the vision-assist system). The vision-assist system, for example, may authenticate and identify the one or more available remote vision-assist systems available for connection (e.g., by device, user, capability and/or other information). The user of the system, in this embodiment, would be able to select one or more available remote vision-assist systems for connection and initiate a communication session request to be transmitted to the selected remote vision-assist system(s). A user of a selected remote vision-assist system(s) can similarly be given the opportunity to authorize connection of the two or more vision-assist systems. In other embodiments, the vision-assist system may automatically authenticate and establish a communication session with one or more of the other available vision-assist systems.

In one embodiment, a communication session established between two or more vision-assist systems may further provide a communications session between users of the participating systems in addition to sharing information between the devices. In this embodiment, for example, the users may participate in an audio, video, text, Braille, or other medium communication session with each other. Thus, in addition to the participating vision-assist systems sharing information, the users of the vision-assist systems may also communicate with one another.

Figure 5:
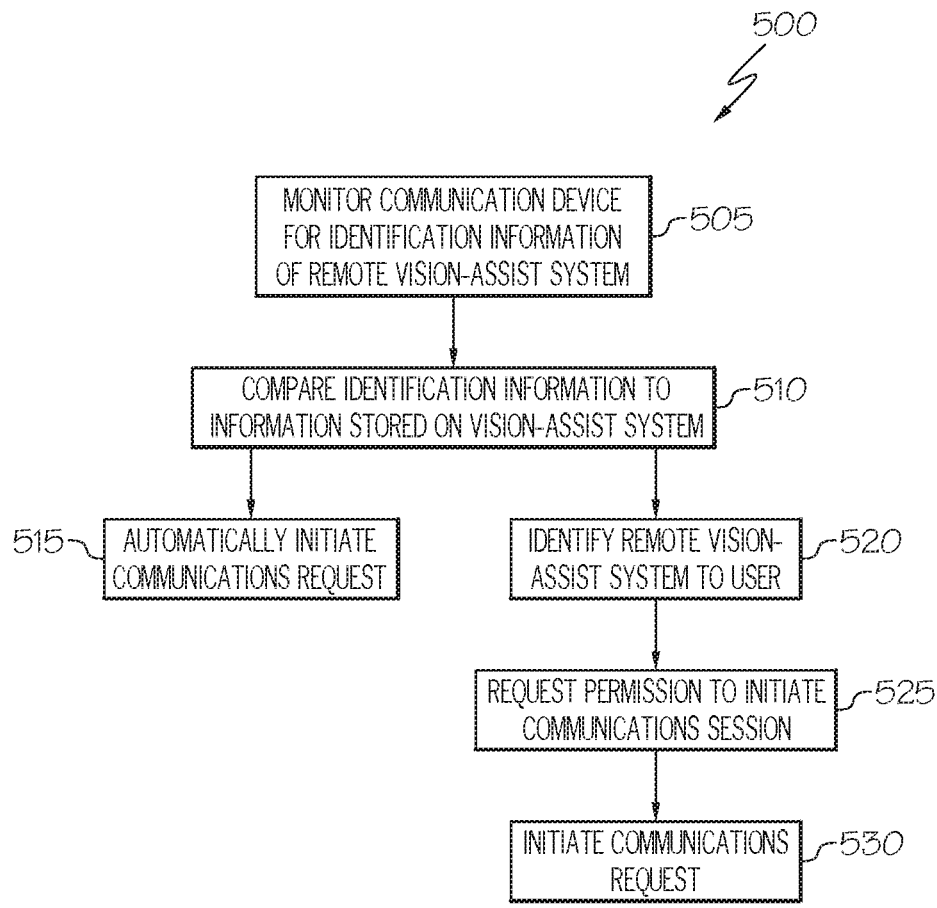
FIG. 5 schematically depicts a flowchart of an example method of identifying and authenticating a remote vision-assist system, according to one or more embodiments shown and described herein.

Referring now to FIG. 5, a flowchart of an example method 500 of identifying and authenticating one or more remote vision-assist systems available for communications session is schematically depicted. In this embodiment, a vision-assist system monitors a communications device for identification information of other remote vision-assist systems available for communicatively coupling with the vision-assist system in operation 505. The vision-assist system, for example, may monitor the communications device for broadcast device or user identifiers of the other available remote vision-assist systems. In other embodiments, the vision-assist system may broadcast a request for other remote vision-assist systems to identify themselves (e.g., where the vision-assist system determines a lack of available environmental information and/or where a user of the vision-assist system requests connection to one or more remote vision-assist systems such as where the user may want to request assistance or additional information from other users or devices).

Upon receipt of identification information from one or more remote vision-assist systems, the vision-assist system compares the identification information to information stored on the vision-assist system in operation 510. In this embodiment, a unique identifier (e.g., a unique device or user identifier), may be stored in a table, database or other data store on the vision-assist system (e.g., in memory or other non-volatile storage) for authenticating identification information received from one or more remote vision-assist systems. If the identification information matches approved identification information stored on the vision-assist system, the vision-assist system may automatically initiate a communications request to the approved vision-assist system in operation 515 and/or may identify the authenticated remote vision-assist system to the user of the vision-assist system in operation 520 and request permission to request a communications session with the remote vision-assist system from the user of the vision-assist system in operation 525. Upon receipt of confirmation from the user of the vision-assist system, the system transmits a communications request (e.g., via a standard or proprietary protocol) to the authenticated remote vision-assist system in operation 530.

Figure 6:
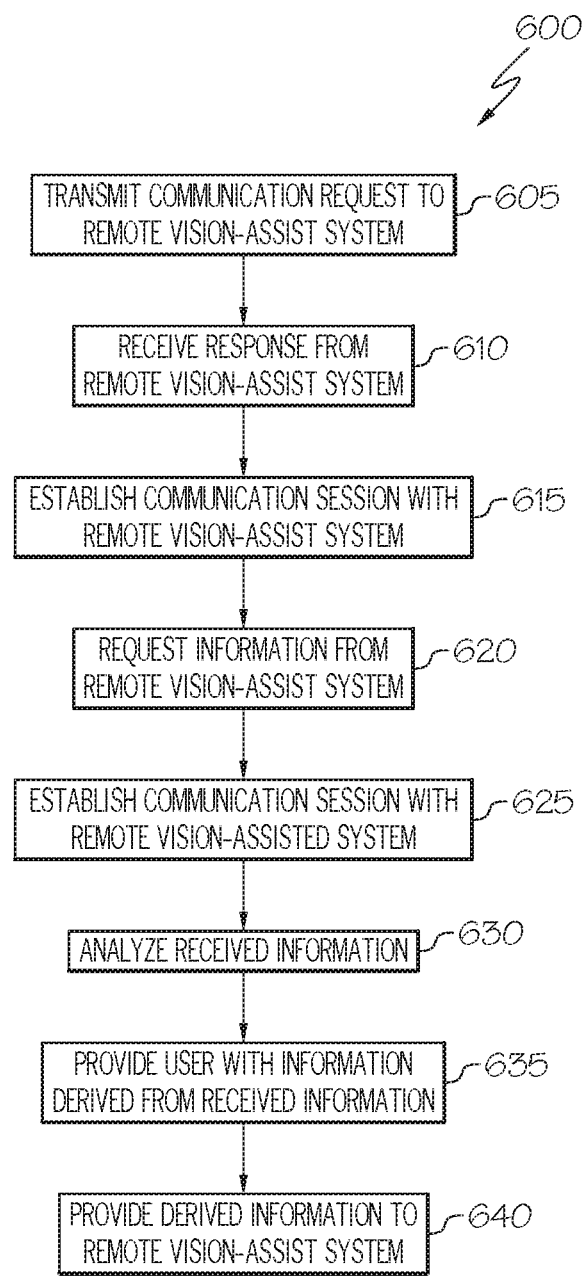
FIG. 6 schematically depicts a flowchart of an example method of communicating with a remote vision-assist system, according to one or more embodiments shown and described herein.

Referring now to FIG. 6, a flowchart of an example method 600 of establishing a communications session with one or more authenticated remote vision-assist systems is schematically depicted. In this embodiment, a vision-assist system transmits a communications request (such as described above with reference to FIG. 5) to one or more available remote vision-assist systems in operation 605. The remote vision-assist systems, for example, may include systems available nearby in a shared environment of the requesting vision-assist system or may be remotely available (e.g., via a network such as the Internet) in another environment of interest to the user of the requesting vision-assist system. The requesting vision-assist system receives a response one or more remote vision-assist systems in operation 610 and establishes a communications session with the remote vision-assist system in operation 615.

The requesting vision-assist system requests information (e.g., environment information) from the one or more remote vision-assist systems in operation 620, and receives a response including information from the one or more remote vision-assist systems in operation 625. The requesting vision-assist system analyzes the received information, either alone or on combination with information stored on the requesting vision-assist system in operation 630. The requesting vision-assist system, for example, may combine audio, image and/or video information received from one or more remote vision-assist systems with audio, image and/or video information stored on the requesting vision-assist system to provide a more comprehensive representation of an environment of interest to a user of the system and analyze the combined information (e.g., identify one or more obstacles, hazards or the like). The requesting vision-assist system provides the user of the requesting vision information derived, at least in part, from the information received from the one or more remote vision-assist systems in operation 635. The requesting vision-assist system, for example, may provide warning(s), directions, feedback or other information to the user. The requesting vision-assist system may further provide information derived from the received information to one or more remote vision-assist units in operation 640.

It should be understood that some example embodiments described herein are directed to vision-assist systems configured to identify and communicate with other vision-assist systems. In one embodiment, the vision-assist system is configured to receive identification information of a remote vision-assist system, authenticate the identification information, initiate a communication session with the remote vision-assist system, receive environment information from the remote vision-assist system, and provide feedback to the user with the feedback device derived at least in part based on the environment information received from the remote vision-assist system. The vision-assist system, for example, can receive environment information from one or more remote vision-assist systems and analyze that information, alone or in combination with information stored on the vision-assist system, to provide feedback to a user of the vision-assist system.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vision-assist system comprising:
a processor;
a memory module communicatively coupled to the processor;
communication hardware configured to communicatively couple the processor to at least one remote vision-assist system;
at least one sensor adapted to detect first environment information from a first region of an environment;
a user feedback device communicatively coupled to the processor; and
machine readable instructions stored in the memory module that cause the vision-assist system to perform at least the following when executed by the processor:
receive identification information of a remote vision-assist system;
authenticate the identification information;
initiate a communication session with the remote vision-assist system;
receive second environment information from the remote vision-assist system from a second region of the environment; and
provide feedback to the user with the feedback device derived at least in part based on the first and second environment information received from the remote vision-assist system.

2. The vision-assist system of claim 1, wherein when executed by the processor, the machine readable instructions cause the vision-assist system to authenticate the identification information of the remote vision-assist system by comparing the identification information to information stored on the memory module.

3. The vision-assist system of claim 2, wherein when executed by the processor, the machine readable instructions cause the vision-assist system to automatically generate a communication session request in response to an authentication of the identification information and transmit the communication session request.

4. The vision-assist system of claim 1, wherein when executed by the processor, the machine readable instructions cause the vision-assist system to authenticate the identification information of the remote vision-assist system by providing a prompt via the feedback device and receiving a confirmation via an input device of the vision-assist system.

5. The vision-assist system of claim 1, wherein the identification information comprises at least one of the following group: a unique device identifier, a unique user identifier, a device-type identifier and a user-type identifier.

6. The vision-assist system of claim 1, wherein the first and second environment information comprises at least one of the following group: audio information, image information, video information, location information and inertial information.

7. The vision-assist system of claim 1, wherein the communication system includes at least one of the following group: text message communication, Braille communication, audio communication, voice communication, video communication and image communication.

8. The vision-assist system of claim 1, wherein the at least one sensor of the vision-assist system comprises at least one camera and the received environment information includes image environment information and when executed by the processor, the machine readable instructions cause the vision-assist system to:
analyze the received image environment information and image information obtained via the camera and stored the memory module and determine environment information derived from a combination of the received image environment information and the image information stored on the memory module.

9. The vision-assist system of claim 1, wherein the at least one sensor of the vision-assist system comprises at least one camera and the received second environment information includes video environment information and when executed by the processor, the machine readable instructions cause the vision-assist system to:
analyze the received video environment information and video information obtained via the camera and stored on the memory module and determine environment information derived from a combination of the received video environment information and the video information stored on the memory module.

10. The vision-assist system of claim 1, wherein the received second environment information includes location environment information and when executed by the processor, the machine readable instructions cause the vision-assist system to:
analyze the received location second environment information and location information stored on the memory module and determine environment information derived from a combination of the received location environment information and the location information stored on the memory module.

11. The vision-assist system of claim 1, wherein the received second environment information includes inertial environment information and when executed by the processor, the machine readable instructions cause the vision-assist system to:
analyze the received second inertial environment information and inertial information stored on the memory module and determine environment information derived from a combination of the received inertial environment information and the inertial information stored on the memory module.

12. The vision-assist system of claim 1, wherein the received second environment information includes audio environment information and when executed by the processor, the machine readable instructions cause the vision-assist system to:
analyze the received audio second environment information and image information stored on the memory module and determine environment information derived from a combination of the received audio environment information and the audio information stored on the memory module.

13. The vision-assist system of claim 1 wherein the feedback comprises identification of an obstacle or hazard.

14. The vision-assist system of claim 1 wherein the feedback comprises identification of a safe path.

15. The vision-assist system of claim 1 wherein the feedback comprises providing directions.

16. The vision-assist system of claim 1 wherein the at least one sensor comprises an environment camera and, when executed by the processor, the machine readable instructions cause the vision-assist system to:
receive environment image data from the environment camera;
determine a location of an individual speaking to a user based on the environment image data;
receive user eye tracking image data from the user eye tracking camera;
determine a pose of the user's eyes based on the user eye tracking image data; and
provide feedback to the user with the feedback device based on the location of the individual speaking to the user and the pose of the user's eyes.

17. A method of obtaining environmental information via a vision-assist system and providing feedback to a user of the vision-assist system, the method comprising:
obtaining first environment information from a first region of an environment via at least one sensor;
identifying at least one remote vision-assist device;
authenticating the remote vision-assist device;
establishing a communications session with the remote vision-assist device;
receiving second environment information from the remote vision-assist device;
analyzing the received second environment information on the vision-assist system; and
providing feedback to the user of the vision-assist system based at least in part on the first and second environment information.

18. The method of claim 17 wherein the received second environment information is compared to the first environment information stored on the on a memory module of the vision-assist system.

19. The method of claim 18 wherein the feedback is determined from a combination of the received environment information and environment information stored on the memory module.

20. A vision-assist system comprising:
a necklace module comprising an environment camera mechanically coupled to the necklace module, the environment camera adapted to detect first environment information;
a processor communicatively coupled to the environment camera;
a memory module communicatively coupled to the processor;
a feedback device communicatively coupled to the necklace module; and
machine readable instructions stored in the memory module that cause the vision-assist system to perform at least the following when executed by the processor:
receive identification information of a remote vision-assist system;
authenticate the identification information;
initiate a communication session with the remote vision-assist system;
receive second environment information from the remote vision-assist system; and
provide feedback to the user with the feedback device derived at least in part based on the first and second environment information.

21. The vision-assist system of claim 20 wherein when executed by the processor, the machine readable instructions cause the vision-assist system to receive the first environment information from the environment camera of the necklace module and the feedback is derived from a combination of the first environment information received from the remote vision-assist system and the second environment information received from the environment camera of the necklace module.

\* \* \* \* \*